United States Patent
Dempski

(10) Patent No.: US 7,126,558 B1
(45) Date of Patent: Oct. 24, 2006

(54) INDUSTRIAL AUGMENTED REALITY

(75) Inventor: Kelly L. Dempski, Evanston, IL (US)

(73) Assignee: Accenture Global Services GmbH, Schauffhausen (CH)

( * ) Notice: Subject to any disclaimer, the term of this patent is extended or adjusted under 35 U.S.C. 154(b) by 127 days.

(21) Appl. No.: 10/046,468

(22) Filed: Oct. 19, 2001

(51) Int. Cl.
G09G 5/00 (2006.01)

(52) U.S. Cl. .............................. 345/8; 345/9
(58) Field of Classification Search ................ 345/7–9; 702/150; 715/705, 714; 359/13
See application file for complete search history.

(56) References Cited

U.S. PATENT DOCUMENTS

| | | | |
|---|---|---|---|
| 5,696,521 A | 12/1997 | Robinson et al. | |
| 5,731,766 A | 3/1998 | Akamatsu | |
| 5,886,822 A | 3/1999 | Spitzer | 359/630 |
| 6,046,712 A | 4/2000 | Beller et al. | 345/8 |
| 6,091,546 A | 7/2000 | Spitzer | 359/618 |
| 6,094,625 A | 7/2000 | Ralston | 702/150 |
| 6,111,597 A | 8/2000 | Tabata | 348/43 |
| 6,172,657 B1 | 1/2001 | Kamakura et al. | 345/8 |
| 6,301,050 B1 | 10/2001 | DeLeon | |
| 6,356,437 B1 | 3/2002 | Mitchell et al. | 361/683 |
| 6,396,961 B1 | 5/2002 | Wixson et al. | |
| 6,522,312 B1 * | 2/2003 | Ohshima et al. | 345/8 |
| 6,803,887 B1 * | 10/2004 | Lauper et al. | 345/9 |
| 2002/0046368 A1 | 4/2002 | Friedrich et al. | 714/45 |
| 2002/0067372 A1 | 6/2002 | Friedrich et al. | 345/753 |

FOREIGN PATENT DOCUMENTS

FR 0 499 558 A1 8/1992
WO WO 01/08414 * 2/2001

OTHER PUBLICATIONS

Dempski, Kelly L., "Context-Sensitive eCommerce," *2000 Conference on Human Factors in Computer Systems (CHI 2000) Extended Abstracts*, Apr. 1-6, 2000, The Hague, pp. 1-2.
The MicroOptical Corporation, Product Information, http://www.microopticalcorp.com\Products\index.html, 1999-2001, pp. 1-2.
Kato, Hirokazu, et al., "ARToolKit PC version 2.11," Instruction Manual, University of Washington, Dec. 1999, 36 pages, http://www.hitl.washington.edu/grof/SharedSpace/Download/ARToolKitPC.htm.
Neumann, Ulrich, et al., "A Self-Tracking Augmented Reality System," University of Southern California, 1996, pp. 1-9, http://graphics.usc.edu/cgit/pdf/papers/STAR-ACM-VRST96.pdf.
International Search Report dated Feb. 20, 2003, for corresponding international application PCT/US02/33466.
Communication Pursuant to Article 96(2) EPC, Apllication No. 02 773 811.1 - 1234, Jun. 22, 2006.

* cited by examiner

*Primary Examiner*—Kent Chang
(74) *Attorney, Agent, or Firm*—Brinks Hofer Gilson & Lione

(57) ABSTRACT

This invention includes a method and system for viewing data comprising detecting visual markers within view of a wearable camera worn by a human worker, and displaying data associated with at least one of those visual markers on a see-through wearable display worn by the operator.

Another aspect of the invention provides a method and system for coordinating movement of human workers comprising detecting one or more visual markers within view of a camera worn by the worker, and determining the location of the worker from the stored location of the visual marker within view of the camera.

30 Claims, 1 Drawing Sheet

INDUSTRIAL AUGMENTED REALITY

BACKGROUND OF THE INVENTION

This invention relates to information processing systems and methods in an industrial environment. More particularly, the invention relates to systems and methods for displaying information for use by human operators in a mobile working environment.

An increasing number of workers today in mobile working environments are assisted by hand-held or wearable computer systems. Rather than using computer kiosks or workstations at locations throughout the work environment, the hand-held or wearable computers allow the worker to move freely about the workspace and retrieve information from computer networks accessible at their fingertips, while they maintain in proximity to the object of the task. Examples of these include retail operations where sales assistants or inventory control clerks carry hand-held computers with bar code scanners that can identify products by scanning the bar code and then displaying information associated with that product. Another example includes car rental return agents who key information into a wearable computer in the parking lot of the rental agency when the car is returned, and then print out a receipt from a wearable printer to be able to give to a customer standing in the parking lot by the rental car.

While these systems are useful, they have limited capabilities. Hand-held computers require the worker to devote one or both hands to the task of inputting information into the computer. Wearable computers generally require the use of at least one hand for inputting data into a computer, as well as requiring the worker to focus his gaze and attention to the hand-held computer rather than on the object or task before him. While these wearable computer solutions are an advance over stationary kiosks and strategically located catalogs, wall charts or instruction manual books accessible to the worker, there is still much room for improvement to free up the hands and attention of the worker, to thereby increase the workers' productivity.

BRIEF SUMMARY OF THE INVENTION

The present invention addresses the aforementioned needs by providing a method and system for viewing data comprising detecting visual markers within view of a wearable camera worn by a human worker, and displaying data associated with at least one of those visual markers on a wearable display worn by the operator.

Another aspect of the invention provides a method and system for coordinating movement of human workers comprising detecting of one or more visual markers within view of a camera worn by the worker, and determining the location of the worker from the known location of the visual marker within view of the camera.

DETAILED DESCRIPTION OF THE INVENTION

Figure 1:
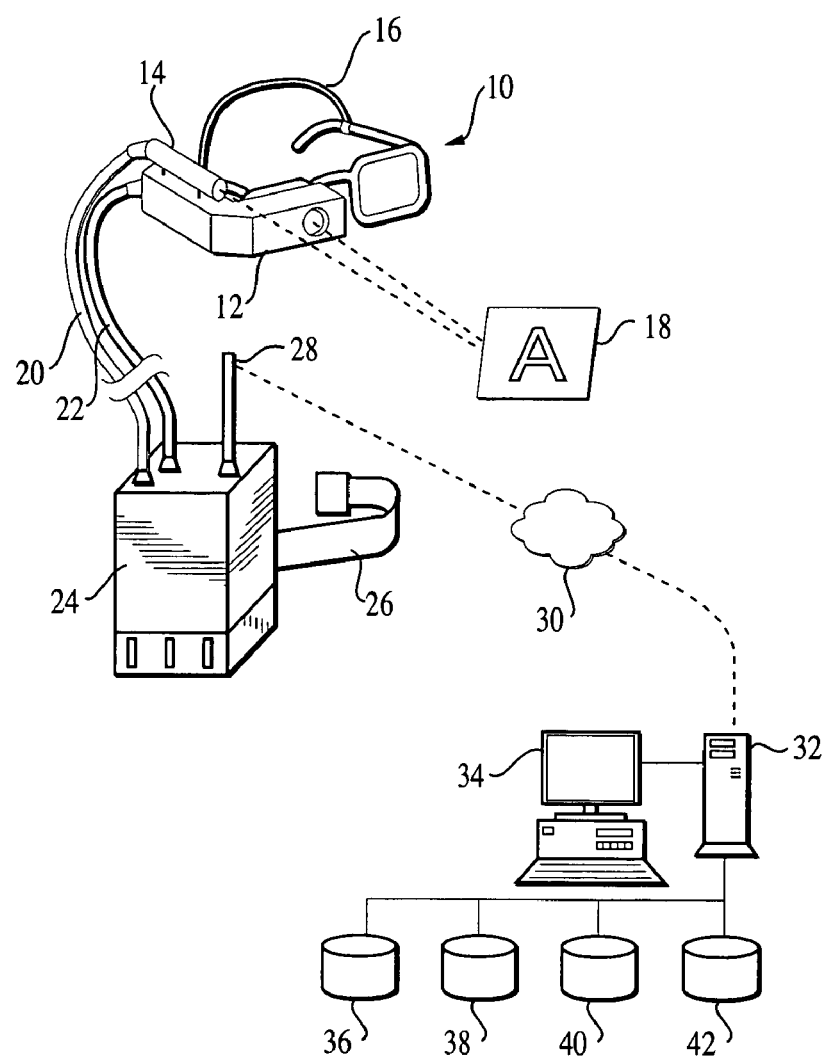
FIG. 1 is a system in accordance with one embodiment of the invention.

Many physical tasks in an industrial work environment can be made more efficient by providing workers with more data about their tasks and their environment. These tasks may include such things as order picking for factory floor activities. This invention makes such tasks more efficient by equipping workers with a small wearable display and a small wearable camera. Preferably both the wearable display and wearable camera are mounted on a pair eyeglasses or goggles. Preferably the camera and display are connected to a small wearable computer. Throughout the work environment, low cost visual markers may be strategically placed to identify locations or objects in proximity to the markers. When the visual marker is within the field of view of the camera, the wearable computer system can "see" and identify the visual marker. Once identified, the wearable display can be used to give the worker instructions or information regarding the identified object or location.

FIG. 1 depicts a typical system in accordance with one embodiment of the invention. A pair of eyeglasses 10 includes a wearable see-through display 12 with a wearable camera 14 both of which are attached to the eyeglasses 10. A headband 16 assists with keeping the glasses on the worker's head. The wearable camera 14 is positioned to detect visual markers 18 within the field of view of the worker.

The camera and display are preferably connected through cables 20 and 22 to a wearable computer 24. However, technological developments may permit the connections to be wireless, obviating the need for cables. The wearable computer 24 includes a belt 26 for strapping it to the waist or an appendage (e.g., arm or leg) of a worker. Preferably, the wearable computer 24 includes a wireless transmitter and antenna 28 for wireless connectivity to a computer network 30 in the industrial environment.

Also connected with the network 30 are a network server 32, a processor 34, and several databases. The databases may include, but are not limited to, a visual marker library 36, visual marker location maps 38, production and operation reference manuals 40, and employee preference and profile library 40.

A typical system as described above may include several components that are presently commercially available. The wearable display 12 may be a see-through or see-around micro-optical display, such as eyeglass displays commercially available form Microoptical Corp., Boston, Mass. USA. The small camera 14 may be attached to or integrated with the eyeglass displays. Numerous such cameras are commercially available. The wearable computer 24 may be one such as commercially available from Xybernaut Corp., Fairfax, Va., USA, with a wireless communication transceiver, for example using an 802.11(b) protocol. The wearable computer 24 or the processor 34 preferably includes a visual marker or pattern recognition system such as, but not limited to, the ARToolkit developed by and available from the University of Washington.

The system also includes a computer network 30 wirelessly accessible to the wearable computer. The computer network includes a processor 34 in communication with a database located on memory storage devices in communication with a server 32. The databases 36, 38, 40 and 42 store the information or data associated with the objects associated with the visual markers and or mapped locations of the visual markers. The databases may also store data about the work environment, object details, current status and location of the workers, etc. The server may also be tied into other data sources, such as fire alarms or deliveries to keep track of more information to display to the workers.

The invention also provides various methods for applying augmented reality in an industrial work environment. One embodiment of the invention includes a method for viewing data, which includes directing a wearable camera worn by a human operator towards one or more labeled objects within a field of view of the operator, detecting one or more visual markers within a field of view of the camera with at least one of the visual markers associated with and proximate to each of the labeled objects, selecting data from a memory storage with the data being associated with one of the objects associated with one of the visual markers, and then displaying the data on a wearable display worn by the operator.

Preferably, the data is selected by identifying which of the visual markers is located within a predetermined zone of the field of view of the camera for a predetermined amount of time of between about 0.02 seconds and 0.5 seconds. The zone is preferably the central 50% of the field of view of the camera.

Preferably, the data is displayed on a see-through display such that the data are superimposed on a real image seen in the field of view of the operator. More preferably, the display is a heads-up see-through display attached to a pair of eyeglasses or goggles worn by the operator on which additional data associated with the object is displayed in response to a request sent by the operator. The request may be an electric signal generated by a voice command from the operator or by a physical touch by the operator, or the request may be a focused gaze upon the object for an extended period of time. Depending on the job activity, the "query" gaze may be between 1 and 2 second of steady gaze for fast-paced activity, such as working in a warehouse, to 5 seconds or longer for slow-paced activity, such as working on a small parts assembly bench, where a worker's gaze does not change much.

Additionally, the method preferably includes processing the image of the detected visual marker to determine a unique identifier associated with the marker, and transmitting the unique identifier to a processor for selecting the data appropriate for the workers present task based on contextual clues observed either through the visual markers presently in view or recently viewed. Preferably, the image processing and pattern recognition is conducted by the wearable computer. This processing may also be done by a workstation computer on the network, with the wearable computer merely transmitting the images viewed through the camera.

In addition, visual markers placed on stationary objects such as walls or stationary equipment allow the computer system to determine where the worker is physically located whenever such marker is "seen" by the system. This allows for efficient tracking of workers or operators and efficient routing of tasks.

This invention, thereby, provides for the coordinating of movement of workers in a work environment. For example, in a warehouse environment, containers and walls can be marked with visual markers. As workers walk around the warehouse, the system can track where they are and where they are going. When a worker is needed in a specific area, the system can identify the nearest worker and provide them with instructions on their wearable display to go to the point of need. When the worker arrives and looks at a specific box or object, the system can identify that object as the correct object of interest, and provide additional instructions for the worker to follow with regard to that object.

Accordingly, a second embodiment of this invention includes a method for coordinating the movement of human workers in a working environment comprising directing a wearable camera worn by a human operator towards a one or more labeled objects within a field of view of the operator, and detecting one or more visual markers within a field of view of the camera with at least one of the visual markers associated with and proximate to each of the labeled objects. Further, the method includes processing the image of the visual markers and determining the unique identifier associated with each marker, obtaining the physical location of the markers maintained in a memory storage; and determining the location of the operator from the locations of the markers within the field of view of the camera.

In addition, the method may preferably include tracking the movement of the operator by monitoring the change of the location of the markers within the field of view of the camera. The movement of the worker is preferably coordinated by displaying data on a see-through display such that the data are superimposed on a real image seen in the field of view of the operator with the data including instructions directing the operator to a new location.

The various embodiments of this invention are not limited to a factory floor environment, but can be applied to a wide variety of industrial work places. Similar scenarios can be described in situations such as hospitals, factories, oil fields, chemical plants or anywhere that are physical tasks that require detailed knowledge to make the task safer and/or more efficient.

The invention allows the operator or worker to interact with the work environment in a very natural manner. Preferably the wearable camera is focused within the same field of view as the operator when focusing straight ahead in a work activity. In this way the system can see the objects that the operator is focusing on. The system is thus programmed to respond to objects that are within the field of view of that camera for at least a predetermined amount of time. If a person stares at an object, that usually means they are trying to obtain more information about the object. Naturally, in response, the system will identify the object of regard, retrieve information about that object from a database, and display that information on the wearable display of the operator. The longer that the operator gazes upon the object the system may optionally be programmed to provide additional information regarding the object. Alternatively, the system may be responsive to voice command of the operator or mechanical inputs from the touch of the operator to provide additional information upon request of the operator.

The system can also be programmed to be responsive to the personal preferences and other personal information maintained in a profile associated with the operator. For example, a worker that has special skills and responsibilities as a mechanical maintenance worker would receive information relating to the repair of an object within his view. On the other hand, a person whose job responsibilities involve the operation or manipulation of objects, such as an assembly line operator, will receive information on their display associated with the operation of an object within their field of view. Likewise, a firefighter staring at the same object may see information about safety precaution or about the volatility of the contents of the object.

Visual based markers are preferred for the system because they are extremely low cost. The visual markers can be bar codes, dot matrix codes, or other recognizable patterns, such as letters and numbers. While it is possible to use other type of non-visual markers such as active or passive radio frequency tags, such tags can be expensive. Also such RF tags usually only give general proximity information. Visual markers can be located actually on objects. For many applications this type of tracking and interaction can be more powerful and/or cost effective.

Depending on the work environment and commonality of objects seen therein, more complex visual pattern recognition systems can be incorporated into this invention. For example, visual quality control inspection systems rely upon pattern recognitions of common elements by comparison with template pattern of such elements. Also, pick and place machines can detect objects out of location by comparison of objects with a database of commonly seen objects.

While this invention has been shown and described in connection with the preferred embodiments, it is apparent that certain changes and modifications, in addition to those mentioned above may be made from the basic features of this invention. In addition, there are many different types of computer software and hardware that may be utilized in practicing the invention, and the invention is not limited to the examples described above. Accordingly, it is the intention of the applicants to protect all variations and modifications within the valid scope of the present invention. It is intended that the invention be defined by the following claims, including all equivalents.

What is claimed is:

1. A method for viewing data associated with one or more objects within a field of view of a human operator, the method comprising:
   positioning one or more visual markers proximate an object within a working environment of the human operator;
   storing information associated with objects within the working environment of the human operator in a database on a memory storage, the information including identification information for at least one visual marker being positioned proximate to an object and data corresponding to the object;
   receiving an image from a wearable camera worn by a human operator and directed towards the field of view of the operator;
   automatically detecting one or more visual markers within the received image through the use of pattern recognition, at least one of said visual markers associated with and proximate to an object within the field of view of the operator;
   in response to automatically detecting one or more visual markers, selecting data from the database located on a memory storage, said data being selected according to the identification information for the detected one or more visual markers and having a predefined association with one of said objects associated with the detected one or more visual markers; and
   displaying the data on a wearable display worn by said operator.

2. The method of claim 1, wherein said selecting data includes identifying which of said visual markers is located within a predetermined zone of view of said camera for a predetermined amount of time.

3. The method of claim 2, wherein said zone is a central 50% of the field of view of the camera.

4. The method of claim 1, wherein the data is displayed on a see-through display such that the data are superimposed on a real image seen in the field of view of the operator.

5. The method of claim 1, further comprising displaying additional data associated with said object in response to a request sent by the operator.

6. The method of claim 1, further comprising processing the image of the detected visual marker to determine a stored unique identifier associated with the marker, and transmitting the stored unique identifier to a processor for selecting said data.

7. The method of claim 5, wherein said request is an electric signal generated by a voice command from the operator.

8. The method of claim 5, wherein the request is an electric signal generated by a physical touch by the operator.

9. The method of claim 5, wherein the request is determined by maintaining the object of interest within the predetermined zone of view for a predetermined period of time.

10. The method of claim 1, wherein the visual marker comprises a physical real-world machine-recognizable pattern.

11. The method of claim 1 further comprising providing one or more real world visual markers on one or more objects in a work environment of a human operator.

12. The method of claim 1 further comprising storing an employee preference and profile in the database.

13. The method of claim 9 further comprising storing an employee preference and profile in the database.

14. The method of claim 13 where the predetermined period of time is determined according to the employee preference and profile.

15. A method for coordinating the movement of human workers in a working environment having one or more objects labeled with a visual marker therein, the method comprising:
   receiving an image from a wearable camera worn by a human operator and directed towards a field of view of the operator;
   automatically detecting one or more visual markers within the image through the use of pattern recognition, at least one of said visual markers associated with and proximate to at least one of the objects;
   in response to automatically detecting one or more visual markers, processing the image of the visual marker and determining a unique identifier associated with the marker;
   in response to determining the unique identifier, obtaining the physical location of the marker maintained in a database located on a memory storage, the database storing predefined associations of unique identifiers and locations of the visual markers; and
   determining the location of the operator based on the location of the one or more markers within the field of view of the camera.

16. The method of claim 15, further comprising tracking the movement of the operator by monitoring the change of the location of the markers within the field of view of the camera.

17. The method of claim 15, further comprising tracking the movement of the operator by monitoring the series of markers passing within the field of view of the camera.

18. The method of claim 15, further comprising displaying data on a see-through display such that the data are superimposed on a real image seen in the field of view of the operator, wherein said data includes information directing the operator to a new location.

19. The method of claim 15, wherein the visual marker comprises a physical real-world machine-recognizable pattern.

20. The method of claim 15 further comprising providing one or more real world visual markers on one or more objects in a work environment of a human operator.

21. A system for viewing data comprising:
   a wearable camera worn by a human operator, said camera capable of viewing at least a substantial portion of a field of view of the operator, and capable of viewing visual markers proximate to objects within the field of view of the operator;

a wearable computer system having logic capable of detecting one or more visual markers within the field of view of the camera, determining an identifier associated with the marker in response to detecting one or more visual markers, and wirelessly transmitting the identifier to a computer network and wirelessly receiving predefined data associated with the identifier from the computer network;

a memory storage in communication with the network, the memory storage storing the identifier associated with the visual markers with the predefined data associated with the identifier and providing the predefined data associated with the identifier in response to receiving the identifier; and a wearable display configured to display the predefined data.

22. The system of claim 21 wherein the wearable display is a see-through display permitting simultaneous viewing of information on the display and of objects within the field of view of the operator.

23. The system of claim 22, wherein data associated with the identifier is superimposed on the see-through display on a real image of the field of view of the operator.

24. The system of claim 21, wherein the memory storage further comprises at least one database storing information associated with the marker.

25. The system of claim 21, wherein the memory storage further comprises at least one database storing information associated with a profile of the operator.

26. The system of claim 25, wherein the wearable computer comprises logic capable of detecting one or more visual markers within the field of view of the camera based on a predetermined amount of time that the one or more visual markers are within the field of view of the camera.

27. The system of claim 26, wherein the predetermined amount of time is based on the operator profile stored in the memory storage.

28. The system of claim 21, further comprising a library of visual markers including real-world machine recognizable patterns.

29. The system of claim 21, wherein detecting one or more visual markers within the field of view of the camera is based on contextual clues observed through presently viewed visual markers.

30. The system of claim 21, wherein detecting one or more visual markers within the field of view of the camera is based on contextual clues observed through previously viewed visual markers.

* * * * *

UNITED STATES PATENT AND TRADEMARK OFFICE
CERTIFICATE OF CORRECTION

| | |
|---|---|
| PATENT NO. | : 7,126,558 B1 |
| APPLICATION NO. | : 10/046468 |
| DATED | : October 24, 2006 |
| INVENTOR(S) | : Kelly L. Dempski |

It is certified that error appears in the above-identified patent and that said Letters Patent is hereby corrected as shown below:

In column 2, line 43, before "Microoptical Corp." replace "form" with --from--.

Signed and Sealed this

Twentieth Day of April, 2010

David J. Kappos
*Director of the United States Patent and Trademark Office*